US005959981A

United States Patent [19]

Bruckert et al.

[11] Patent Number: 5,959,981

[45] Date of Patent: Sep. 28, 1999

[54] METHOD AND APPARATUS FOR TRANSMITTING INFORMATION IN A COMMUNICATION NETWORK

[75] Inventors: Eugene J. Bruckert, Arlington Heights; Michael D. Kotzin, Buffalo Grove; Nelson Hung, Long Grove, all of Ill.

[73] Assignee: Motorola, Inc., Schaumburg, Ill.

[21] Appl. No.: 08/829,573

[22] Filed: Mar. 31, 1997

[51] Int. Cl.$^{6}$ .................................................... H04B 7/216

[52] U.S. Cl. .......................... 370/331; 370/335; 455/436

[58] Field of Search .................................... 370/328, 329, 370/331, 335, 342, 441; 375/200, 206; 455/422, 436, 437, 438, 439, 442

[56] References Cited

U.S. PATENT DOCUMENTS 5,228,029 7/1993 Kotzin .................................... 370/331
5,363,404 11/1994 Kotzin .................................... 375/200
5,640,679 6/1997 Lundqvist et al. ...................... 455/436

*Primary Examiner*—Ricky Ngo
*Attorney, Agent, or Firm*—Kenneth A. Haas

[57] ABSTRACT

In a communication system where frame boundaries for the discrete frames for different users may be offset relative to one another, assignment of a remote unit (125) to a particular frame offset occurs by a processor (321) determining a frame offset belonging to a group that is the least busy group of all possible groups. In addition, during handoff of the remote unit (125) from a serving base station (130) to a neighboring base station, the remote unit (125) is attempted to be kept within the same call group, however should the same call group of the neighboring base station be filled, the remote unit (125) is placed in a second call group that is one call group prior to the current call group.

12 Claims, 4 Drawing Sheets

701: THE CDMA NETWORK GROUPS CALLS TO BE TRANSMITTED OVER A T1 INTERFACE INTO A NUMBER OF GROUPS, EACH GROUP HAVING A OF DISCRETE FRAME OFFSET TIMING

703: BASE STATIONS WITHIN THE CDMA NETWORK DETERMINE AN AMOUNT OF SPACE AVAILABLE IN ANY OF THE OF GROUPS AND ASSIGN THE CALLS TO BE TRANSMITTED OVER THE T1 TO SPECIFIC GROUPS

705: BASE STATION SERVING THE CALL SENDS A CHANNEL ASSIGNMENT MESSAGE TO THE REMOTE UNIT AND BEGINS TRANSMITTING THE INFORMATION WITH THE PARTICULAR FRAME OFFSET TIMING OF THE GROUP 605
601
20ms
UNIT 1
UNIT 2
UNIT 24
2.50ms
UNIT 25
UNIT 26
UNIT 48
2.50ms
UNIT 49
UNIT 50
UNIT 72
T1 TRANSMISSION
1 2 3 4 5 6 7 8 9 10 11 12 13 14 15 16 17 18 19 20 21 22 23 24
2.50ms
GROUP NUMBER 1
603

METHOD AND APPARATUS FOR TRANSMITTING INFORMATION IN A COMMUNICATION NETWORK

FIELD OF THE INVENTION

The present invention relates generally to communication networks and, in particular, to span line transmission of frame offset traffic channels in such communication networks.

BACKGROUND OF THE INVENTION

A cellular communication system generally comprises a plurality of remote units in radio communication with a plurality of base sites, coupled to a centralized base station controller (CBSC). In some cases the base sites are coupled directly to a mobile switching center (MSC). The coupling means is generally via b-idirectional microwave or wireline terrestrial-based circuits such as T1 ISDN links. One communication system employing such a system layout is a Code Division Multiple Access (CDMA) communication system. A communication system utilizing the CDMA system protocol is described in detail in TIA/EIA Interim Standard IS-95A, Mobile Station-Base Station Compatibility Standards for Dual-Mode Wideband Spread Spectrum Cellular Systems, Telecommunications Industry Association, Washington, D.C. July 1993 (IS-95A) which is incorporated by reference herein.

In a CDMA communication system a packet scheme may be utilized to transport voice or data frames between a base station and a CBSC/MSC. As described in U.S. Pat. No. 5,363,404 APPARATUS AND METHOD FOR CONVEYING INFORMATION IN A COMMUNICATION NETWORK, such a packet scheme allows for the time offset (frame offset) of voice frames transmitted between the base station and the CBSC/MSC in consideration of frame offsets used for the packets as they are received/transmitted over the air interface. In such a communication system, each call can be assigned to one of 16 call groups or frame offsets, where a typical 20 ms (millisecond) air interface frame of information of a call in group number n (where n=0, 1, 2, . . . , 15) is sent/received by a base station with a time offset of 1.25*n ms. In other words, the frames of calls within one call group are "offset" in time by multiples of 1.25 ms from those in other call groups. Because a T1 span line operates at 1.536 Mbps, it can support 192 voice calls utilizing an 8 kbps vocoder, with a maximum of 12 calls in each of the 16 call groups. In other words, the maximum differential delay created by partitioning the T1 into 16 groups is 1.25 ms.

Utilizing such a frame offset technique for transmission between a base station and CBSC/MSC and such T1 partitioning requires an even distribution of calls among call groups for maximum traffic carrying capacity. An even distribution of calls among call groups is easy to achieve if there were no need for communication between more than one base station (i.e., no need for handoff or soft handoff). The need for soft handoff requires the same call group be utilized for communication between each base station in communication with the remote unit. In other words, a remote unit utilizing call group 1, must be kept in group 1 after handoff. Thus, a remote unit entering a cell may be blocked from handing off to that cell if the corresponding call group is filled (i.e., the call group has the maximum of 12 calls within the group), even if there exists space for the call in another call group. The inability to enter handoff leads to inefficient utilization of the communication system. Thus a need exists for a method and apparatus for optimizing information transmitted in a communication network that reduces the inefficient utilization of the communication system.

DETAILED DESCRIPTION OF THE DRAWINGS

Figure 1:
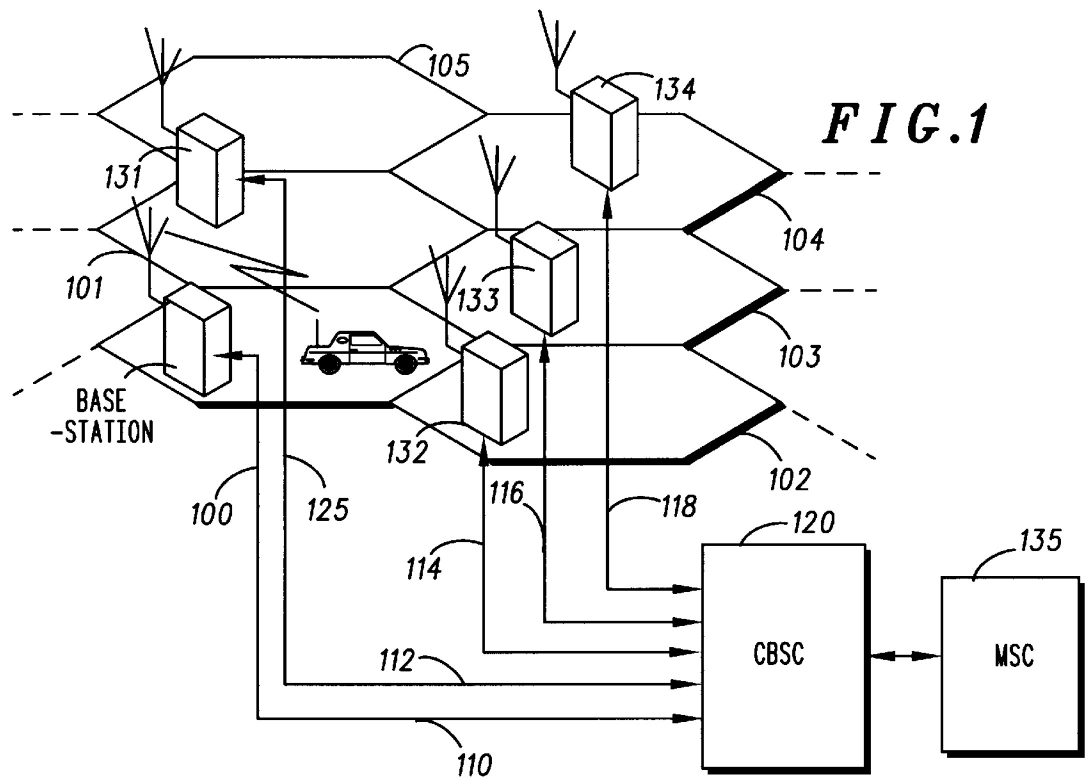
FIG. 1 generally depicts a communication network which may beneficially employ the present invention.

Stated generally, in a communication system where frame boundaries for discrete frames for different users may be offset relative to one another, assignment of a remote unit to a particular frame offset occurs by a processor determining a frame offset belonging to a group that is the least busy group of all possible groups. In addition, during handoff of the remote unit from a serving base station to a neighboring base station, the remote unit is attempted to be kept within the same call group. However should the same call group of the neighboring base station be filled, the remote unit is placed in a second call group that is one call group prior to the current call group.

The present invention encompasses a method for transmitting information in a communication network having a number of groups with discrete frame offset timings. The method includes the steps of determining, from the number of groups, an amount of space available in each of the groups and assigning information to be transmitted to a group based on the determination. Information to be transmitted is assigned a frame offset timing corresponding to the group and transmitted with the frame offset timing.

An alternate embodiment of the present invention encompasses a method for transmitting information in a communication network. The method comprises the steps of transmitting from a first base station, the information in a first group having a first discrete frame offset timing and determining a need for a remote unit to communicate with a second base station. Next, a determination is made of an amount of space available in any of the plurality of groups and the information is transmitted in a second group having a second discrete frame offset timing, where the step of transmitting the information in the second group is based on the amount of space available in any of the plurality of groups.

A further embodiment of the present invention encompasses a method for transmitting information in a communication network. The method comprises the steps of transmitting at a first time, the information utilizing a packet scheme where the information transmitted is assigned to a first frame offset chosen from a first plurality of frame offsets. The method additionally comprises the steps of transmitting at a second time, the information utilizing the packet scheme, where the information transmitted is assigned to a second frame offset chosen from a second plurality of frame offsets, and the second plurality of frame offsets is different in number than the first plurality of frame offsets.

A further embodiment of the present invention encompasses an apparatus for transmitting information in a communication network. The apparatus comprises a processor for determining, from a plurality of groups having a plurality of discrete frame offset timings, an amount of space available in any of the plurality of groups and assigning the information transmitted to a first group existing within the plurality of groups based on the determination, where the first group has a first frame offset timing. The apparatus additionally comprises RF circuitry for transmitting the information with the first frame offset timing.

A futher embodiment of the present invention encompasses an apparatus for transmitting information in a communication network. The apparatus comprises RF circuitry existing in a first base station, for transmitting the information in a first group having a first discrete frame offset timing, a processor for determining a need for a remote unit to communicate with a second base station, the processor additionally determining, from a plurality of groups having a plurality of discrete frame offset timings, an amount of space available in any of the plurality of groups. The apparatus additionally comprises RF circuitry existing in a second base station, for transmitting the information in a second group having a second discrete frame offset timing, where the information transmitted in the second group is based on the amount of space available in any of the plurality of groups.

A final embodiment of the present invention encompasses an apparatus for transmitting information in a communication network. The apparatus comprises RF circuitry capable of transmitting the information utilizing a packet scheme where the information transmitted is assigned to a first frame offset chosen from a plurality of frame offsets. The apparatus additionally comprises a processor for modifying transmission from the RF circuitry such that the information is assigned to a second frame offset chosen from a second plurality of frame offsets, wherein the second plurality of frame offsets is different in number than the first plurality of frame offsets.

FIG. 1 generally depicts a communication network which may beneficially employ the present invention. In the preferred embodiment, the communication network is a CDMA cellular radiotelephone network having base stations 130–134 coupled to CBSC 120 via T1 span lines 110–118. Although in the preferred embodiment of the present invention base stations 130–134 are coupled to CBSC 120 via T1 ISDN links 110–118, in alternate embodiments of the present invention, base stations 130–134 may be coupled to CBSC 120 via alternate coupling means (such as alternate wireline terrestrial-based circuits or bi-directional microwave). CBSC 120 serves as an interface means between an MSC 135 and base stations 130–134. As shown in FIG. 1, remote unit 125 communicates with a serving base station, which is illustrated in FIG. 1 as base station 130. While this invention has utility for both directions of communications between CBSC 120 and base stations 130–134, only the downlink direction from CBSC 120 to base stations 130–134 is described.

Figure 2:
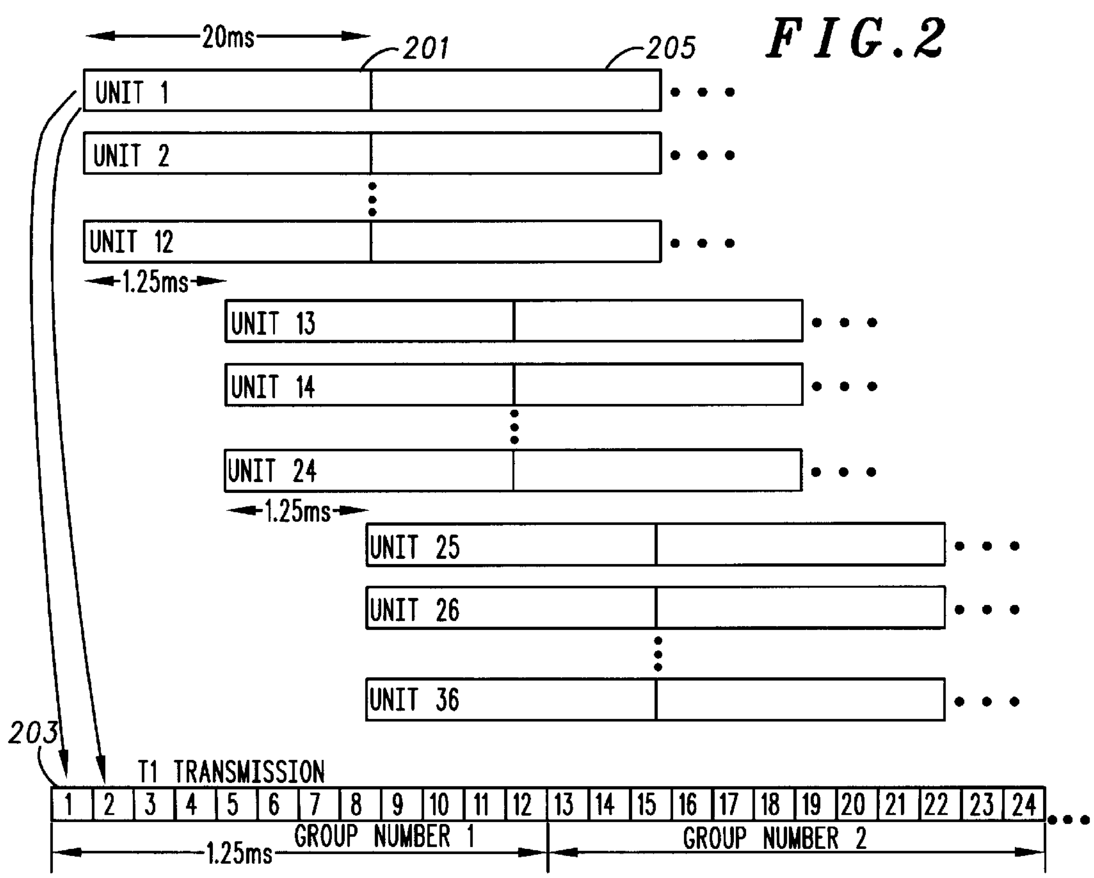
FIG. 2 generally depicts the framing format of a T1 link utilized to convey information from a base station controller to multiple base stations.

Information from base station 130 intended for remote unit 125 is conveyed via link 110, which in the preferred embodiment is a T1 link. In the preferred embodiment, the information may either be voice (speech) or data information. FIG. 2 generally depicts the framing format of T1 links 110–118 utilized to convey information from CBSC 120 to base stations 130–134 in accordance with the preferred embodiment of the present invention. As shown, each remote unit within the communication system receives information in logical frames which are 20 ms in length. In the preferred embodiment of the present invention information contained in each 20 ms frame is buffered and then transmitted over the T1 interface 110 in a 0.104 ms slot at a data rate of 1.536 Mbps. It should be noted that the maximum of 12 calls per call group requires 12 slots, (one for each call) per call group. This is illustrated in FIG. 2 where 20 ms frame 201 is transmitted over the T1 interface in slot 203. The next 20 ms frame transmitted to remote unit 125 (frame 205) will be transmitted in the same slot number, when that slot number is again transmitted (20 ms later).

Figures 3, 5:
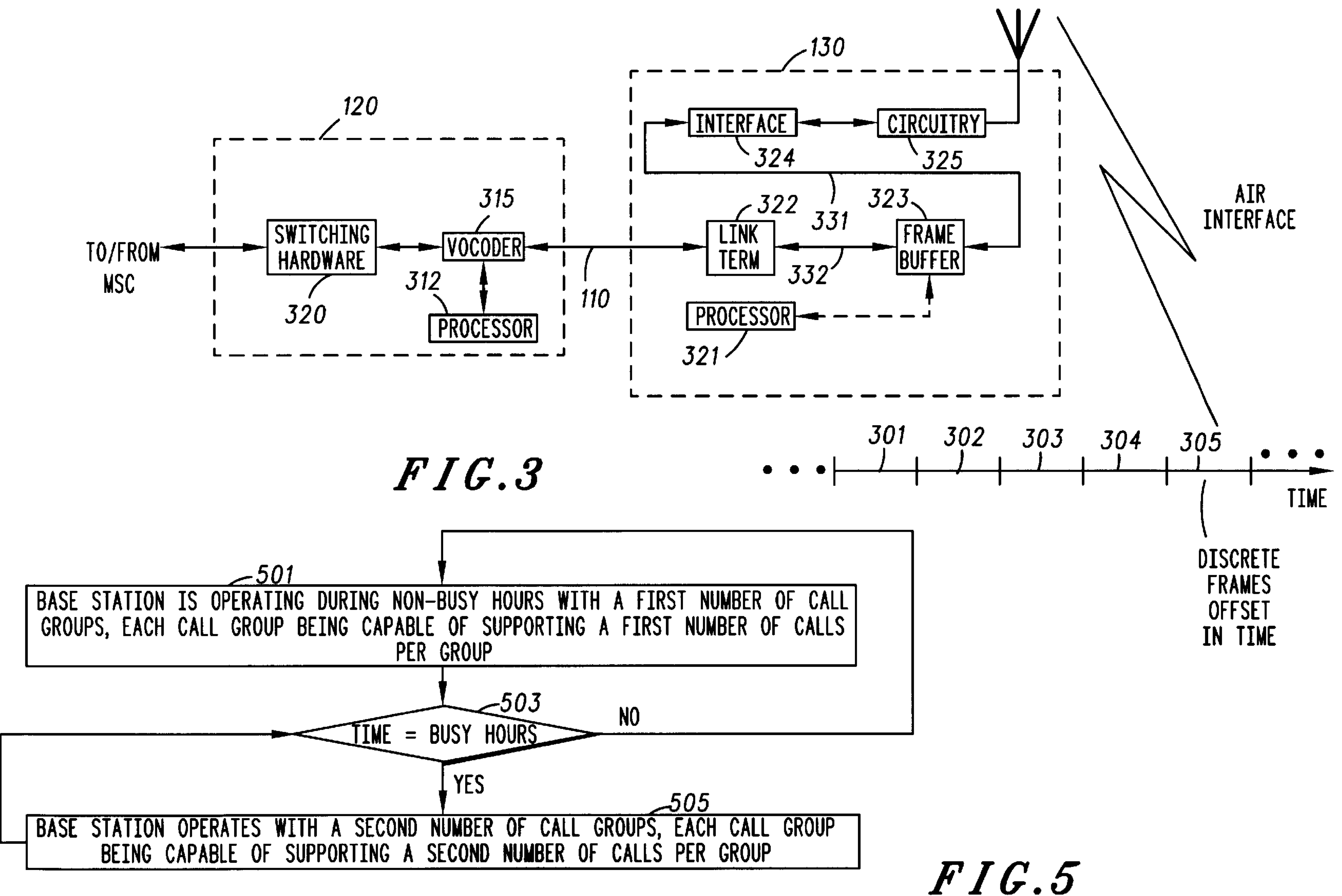
FIG. 3 is a CDMA network conveying information via an air interface having framed downlink communications at a rate of 20 ms per frame.
FIG. 5 is a flow chart illustrating operation of a base station in accordance with the alternate embodiment of the present invention.

FIG. 3 is a CDMA network conveying information via an air interface having framed downlink communications at a rate of 20 ms per frame. In the preferred embodiment of the present invention, CBSC 120 contains, inter alia, a vocoder 315, RF circuitry 325, switching hardware 320 coupled to an MSC 135, and processor 312. Although vocoder 315 is shown existing within CBSC 120, vocoder 315 may be located elsewhere within the communication system (i.e., within MSC 135). Continuing, vocoder 315 is utilized to compress voice data from MSC 135, via switching hardware 320, into packets of compressed voice data which can be transferred over T1 link 110 to base station 130, and eventually to remote unit 125. Vocoder 315 has the unique capability of coding speech at variable rates, where the instantaneous rate is dependent on the number of bits vocoder 315 determines are required to achieve a desired quality level. Therefore, the packets of compressed voice data are of variable length.

The CDMA air interface provides means such that the frame boundaries for the discrete frames for different users may be offset relative to one another. Thus, as shown above with reference to FIG. 2, each discrete frame 301–305 is staggered (or offset in time) on a 1.25 ms basis producing 16 distinct time offsets (or groups) for frame start, with each group having a maximum of 12 calls. Important to note is that all remote units have a common reference time, delayed only by a transmission time from a base station to a remote unit. In the preferred embodiment of the present invention, each discrete frame 301–305 contains coded vocoder information that describes 20 ms of speech, and is itself 20 ms in length, thus using a partitioned T1 to carry user frames, allows for each group to have a maximum of 12 calls.

As discussed above, a remote unit entering a cell may be blocked from handing off to that cell if the corresponding call group is filled, even if there exists space for the call in another group. For example, remote unit 125 in communication with base station 130 and utilizing group number 1 may travel from coverage area 100 to coverage area 102 and need to communicate with base station 132. If base station 132 has corresponding call group 1 filled, remote unit 125 will be unable to hand off to base station 132, possibly resulting in a dropped call. Therefore it is beneficial to originally assign remote unit 125 to the best possible group prior to the need for handing off remote unit 125.

Assignment of remote unit 125 to a particular group number in accordance with the preferred embodiment of the present invention occurs as follows: When a call request arrives at CBSC 120, processor 321 determines if all groups are filled, (or in an alternate embodiment, an amount of space available in each group) and if so, the call is blocked and a fault is relayed to a network manager. If there is space available, processor 321 determines an optimal group (i) to place remote unit 125 into such that, in a first embodiment, i=j having the minimum value for {N(j)}, where i=optimal group number, j=1, 2, . . . , 15

N(j)=number of calls in group number j, (i.e., number of slots occupied in group j).

In other words, in the first embodiment of the present invention, information that is to travel over T1 line 110 and eventually be transmitted to remote unit (via RF circuitry 325) is assigned to group i, chosen by processor 321 such that group i is the least busy group of the 15 possible groups.

In a second embodiment of the present invention, processor 321 chooses an optimal group based on group loading in other (non-serving) base stations. In the second embodiment, group (i) is chosen such that $$i = j \text{ having the minimum value for } \left\{ N(j) + \sum_{All\ neighbor\ \ Cells\ k} F_{jk} * N_{jk} \right\}$$

where i=optimal group number, j=1, 2, . . . , 15

$F_{ik}$=weight function for group (j) in base station (k)

$N_{ik}$=number of calls in group (j) for base station (k)

In the second embodiment, the weighting function (F) is set to 1, however, in further alternate embodiments, the weighting function (F) can be proportional to a handoff rate from cell (k) to the source cell, the proximity of the remote unit to the cell (k), the mobility likelihood of the call, the load factor L, and is inversely proportional to the maximum number of calls allowed in the span line slot. Additionally, in yet a further embodiment of the present invention, processor 321 determines an optimal group by utilizing a combination of the first and the second embodiments such that call groupings are chosen via first embodiment during non-busy hours, and via the second embodiment during very busy hours. In other words, in the second embodiment of the present invention, information that is to travel over T1 line 110 and eventually be transmitted to remote unit 125 (via RF circuitry 325) is assigned to group i, chosen by processor 321 such that group i is based on loading factors in other base stations. By originally assigning remote unit 125 to the best possible group prior to the need for handing off remote unit 125, the amount of dropped calls during handoff can be reduced, greatly increasing system capacity.

Figure 4:
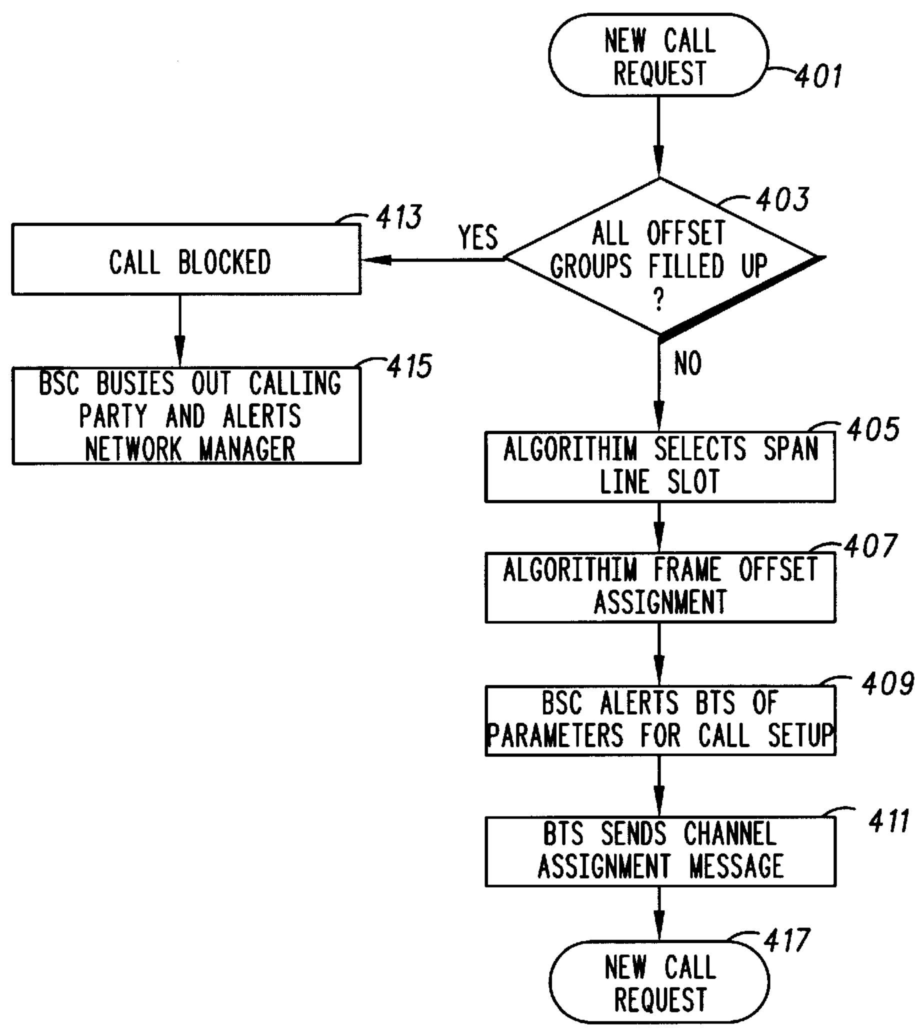
FIG. 4 is a flow chart illustrating those steps necessary to choose an optimal slot for a remote unit during call origination in accordance with a preferred embodiment of the present invention.

FIG. 4 is a flow chart illustrating those steps necessary to choose an optimal group for a remote unit during call origination in accordance with a preferred embodiment of the present invention. The logic flow begins at step 401 where a new call request occurs between remote unit 125 and serving base station 130. Next, at step 403 processor 321 determines if all possible call groups are filled, and if so, the call is blocked (step 413) and CBSC 120 sends an error message to the calling party (step 415). If, at step 403 it is determined that there are possible call groups that remote unit 125 can be placed into, then the logic flow continues to step 405 where processor 321 determines an optimal group to place the call into. As discussed above, there are three preferred methods for determining the optimal group to place the call into. Next, at step 407, processor 321 determines a particular slot for the call to be placed into. In the preferred embodiment of the present invention, the particular slot within a call group is chosen randomly by processor 321. At step 409, processor 321 alerts serving base station 130 of the group and slot number, the base station sends this information (within a channel assignment message) to remote unit 125 (step 411), and the logic flow ends at step 417.

During handoff of remote unit 125 from serving base station 130 to a neighboring base station, an attempt is made to keep remote unit 125 within the same call group, however should the call group of the neighboring base station be filled, in the preferred embodiment of the present invention, processor determines if a slot exists in a second call group in the neighboring base station that is one group prior to the current call group, and if so, the call is placed in that call group. For example, if remote unit is in a first call group with a time offset of n*1.25 ms, and needs to be handed off to a neighboring base station with no space available within the same call group, then processor 321 determines if space is available in a second call group with a time offset of (n+1)*1.25 ms. If there is space available in the second call group, then the transmission is buffered at CBSC 120 for approximately 1.25 ms, and remote unit 125 is handed off to the neighboring base station to communicate within the second call group.

In an alternate embodiment of the present invention, during busy hours the problem of filled call groups during handoff is alleviated by reducing the number of call groups supported by system base stations by "bundling" groups to reduce the number of groups available and increase the number of slots per group. For example, if N denotes a first number of call groups supported by a base station during non-busy hours, each call group having a maximum of K calls supported, then by bundling the call groups to form a second number of call groups M, where M<N, then each call group can support K*M calls per group. By supporting more calls per group, the problem of handing off to call groups that are filled is reduced. In the alternate embodiment of the present invention, during non-busy hours, base stations within the communication system operate by utilizing 16 call groups, each capable of supporting 12 calls. As described above, each remote unit is assigned a particular time offset of n*1.25 ms to begin transmission (where n=1, 2, . . . , 16). During busy hours, the number of call groups is reduce to 8, with each call group capable of supporting 24 calls. During busy hours each remote unit is assigned a particular time offset of n*2.50 ms to begin transmission (where n=1, 2, . . . , 8). Because the number of calls per call group is increased when the amount of call groups are reduced, the probability increases that a call group has available space for supporting a call. Because of this, the amount of calls that are blocked during handoff can be greatly reduced.

FIG. 5 is a flow chart illustrating operation of a base station in accordance with the alternate embodiment of the present invention. The logic flow begins at step 501 where the base station is operating during non-busy hours with a first number of call groups, each call group being capable of supporting a first number of calls per group. As discussed above, in the alternate embodiment of the present invention, during non-busy hours, base stations within the communication system operate with 16 call groups, each capable of supporting 12 calls per group. Next, at step 503 processors 312 and 321 within base station 120 and CBSC 130 determine if a first predetermined time has passed. In the alternate embodiment of the present invention, processors 312 and 321 determine if the communication system is operating during busy hours of operation. If at step 503 it is determined that the communication system is operating during non-busy hours, then the logic flow returns to step 501 otherwise the logic flow continues to step 505 where call group bundling takes place. In particular, at step 505 base station 120 operates with a second number of call groups, each call group being capable of supporting a second number of calls per group. In the alternate embodiment of the present invention, during busy hours, the communication system operates with 8 call groups, each capable of supporting 24 calls per call group. It should be noted that when implementing call group bundling, remote units time offset must be advanced in order to accommodate the change in time offsets. In the alternate embodiment of the present invention, this is accomplished by re-aligning and advancing the starting point of the speech frames of all effected transcoders in the bundle group by 1.25 ms. The logic flow then returns to step 503.

In further alternate embodiments of the present invention, instead of group bundling with a bundling factor of two (i.e., 16 groups to 16/2 groups) call groups are bundled utilizing a bundling factor of 4, or 8. In other words, after bundling the number of call groups can be 4 or 2, depending on the bundling factor utilized.

Figure 6:
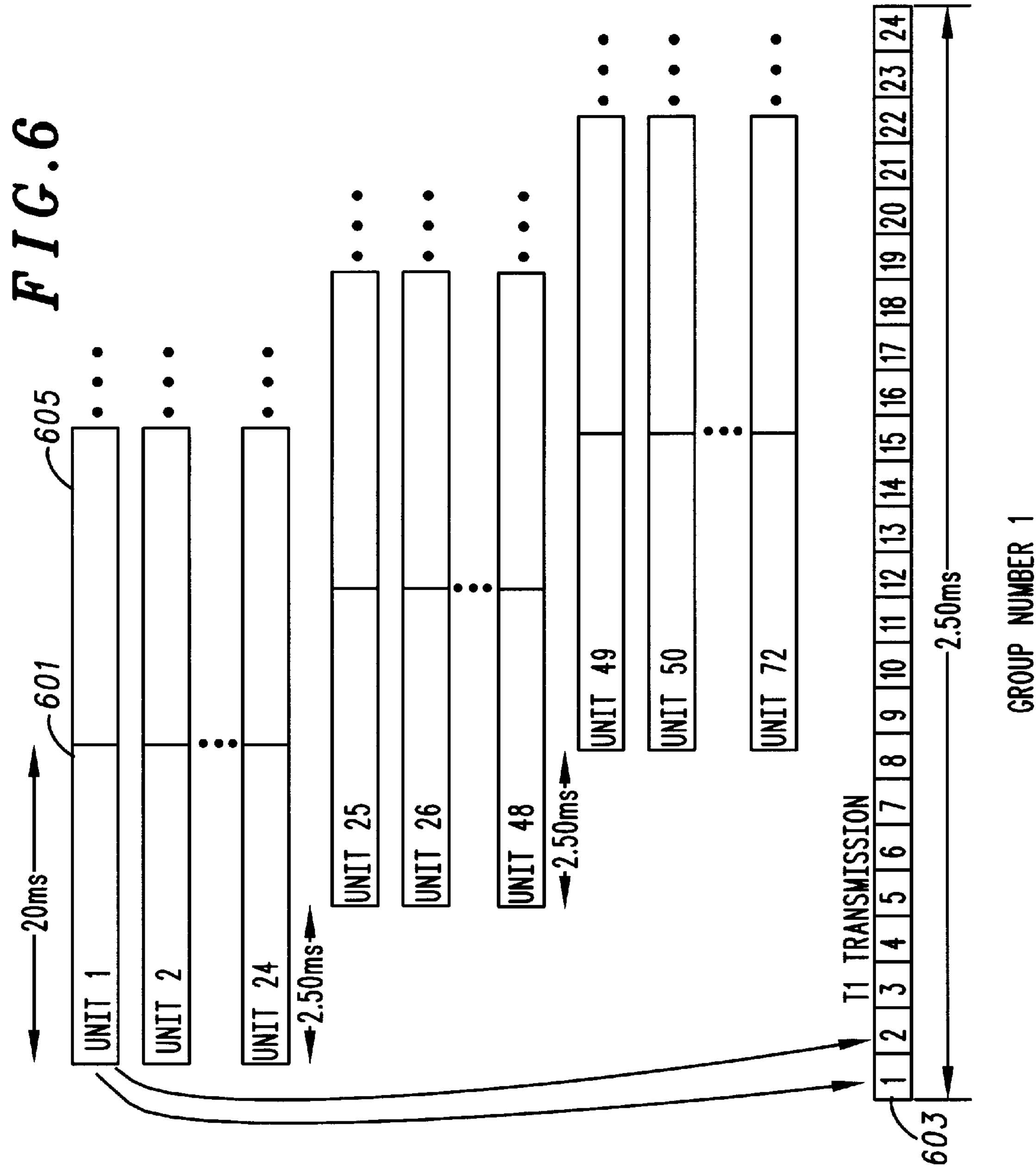
FIG. 6 generally depicts the framing format of a T1 link utilized to convey information from a base station controller to multiple base stations during busy hours of operation in accordance with an alternate embodiment of the present invention.

FIG. 6 generally depicts the framing format of a T1 link utilized to convey information from a base station controller to multiple base stations during busy hours of operation in accordance with an alternate embodiment of the present invention. During busy hours of operation, each call can be assigned to one of 8 call groups or frame offsets, where a typical 20 ms air interface frame of a call from a call group number n (where n=0, 1, 2, . . . , 8) is sent/received by a base station with a time offset of 2.50*n ms. In other words, calls within one call group are "offset" in time by multiples of 2.50 ms from calls in other call groups. Because a T1 span line operates at 1.536 Mbps, it can support 192 voice calls utilizing an 8 Kbps vocoder, with a maximum of 24 calls in each of the 8 call groups As shown, each remote unit transmitting within the communication system transmits in logical frames which are 20 ms in length. In the preferred embodiment of the present invention each 20 ms frame is buffered and then transmitted over T1 interface 110 in a 0.104 ms slot at a data rate of 1.536 Mbps. It should be noted that the maximum of 24 calls per call group requires 24 slots, (one for each call) per call group. This is illustrated in FIG. 6 where, 20 ms frame 601, is transmitted over the T1 interface in slot 603. The next 20 ms frame transmitted by remote unit 125 (frame 605) will be transmitted in the same slot number, when that slot number is again transmitted (20 ms later).

It should be noted that there exists situations where transmission rates from remote unit 125 are less than 8 Kbps. During such sub-rate transmissions from remote units, there may exist situations in which statistical multiplexing occurs. In other words, more than 12 uplink calls are placed within a single call group by statistically multiplexing the calls within the 12 slots available per call group. Usually there will be no problem doing so, since during sub-rate transmission, a remote utilizes a burst-type transmission, where it will cease transmission of periodic 20 ms frames. However, when remote units within a call group begin full rate transmission, there may exist overflow situations where individual frames need to be discarded since more than 12 frames need to be transmitted during the 1.25 ms needed to transmit them. During such situations, CBSC 120 must choose which frames to discard. In the preferred embodiment of the present invention, the CBSC chooses which frames to discard by equally distributing discarded frames among remote units. In other words, if N remote units are transmitting (where N>12) within a call group, each remote unit will have frames discarded every Nth time a frame needs to be discarded. The situation of discarding frames continues until a remote unit can be handed off to a group with less than 12 calls in it. Additionally, in an alternate embodiment of the present invention, a remote unit's transmitted frame will not be discarded if its transmission quality is below a certain threshold.

Figure 7:
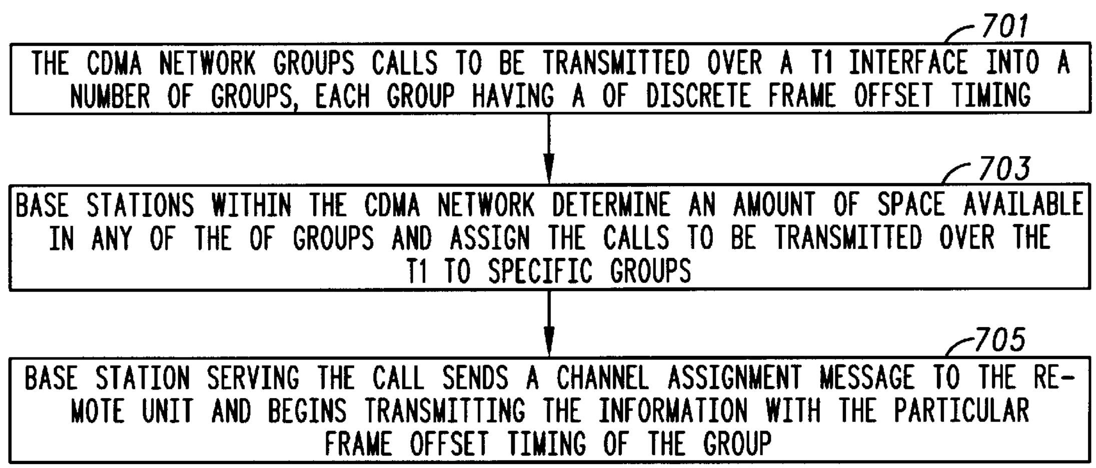
FIG. 7 is a flow chart illustrating operation of the CDMA network of FIG. 3 in accordance with a preferred embodiment of the present invention.

FIG. 7 is a flow chart illustrating operation of the CDMA network of FIG. 3 in accordance with a preferred embodiment of the present invention. The logic flow starts at step 701 where the CDMA network groups calls to be transmitted over a T1 interface into a number of groups, each group having a of discrete frame offset timing. As discussed above, the number of groups can vary based on whether the CDMA network is operating during the busy or non-busy hours. For example, in the preferred embodiment of the present invention, during non-busy hours, base stations within the communication system operate with 16 call groups, each capable of supporting 12 calls per group, and during busy hours of operation base stations within the communication system operate with 8 call groups, each capable of supporting 24 calls per call group.

Continuing, at step 703 base stations within the CDMA network determine an amount of space available in any of the of groups and assign the calls to be transmitted over the T1 to specific groups. As discussed above, the assignment of a particular call to a particular group can take place utilizing several methods. For example, in a first embodiment, calls are assigned to a least busy group. In a second embodiment calls are assigned to an optimal group based on group loading in other (non-serving) base stations. Once a particular call is assigned to a particular group, the base station serving the call sends a channel assignment message to the remote unit and begins transmitting the information with the particular frame offset timing of the group (step 705).

While the invention has been particularly shown and described with reference to a particular embodiment, it will be understood by those skilled in the art that various changes in form and details may be made therein without departing from the spirit and scope of the invention, and it is intended that all such changes come within the scope of the following claims.

What is claimed is:

1. A method for transmitting information in a communication network having a plurality of groups with a plurality of discrete frame offset timings, the method comprising the steps of:

determining, from the plurality of groups existing in a non-serving base station, an amount of space available in any of the plurality of groups;

assigning information to be transmitted to a first group existing within the plurality of groups based on the determination, wherein the first group has a first frame offset timing; and transmitting the information with the first frame offset timing.

2. The method of claim 1 wherein the step of assigning the information to the first group comprises the step of assigning the information to a least busy group existing within the plurality of groups based on the determination.

3. The method of claim 1 wherein the step of assigning the information transmitted comprises the step of assigning the information transmitted to a least busy group existing within the plurality of groups based on the determination.

4. The method of claim 1 wherein the step of assigning information to be transmitted to a first group existing within the plurality of groups comprises the step of assigning information to be transmitted to the first group existing within the plurality of groups based on the determination, wherein the first group has a first frame offset timing, and a number of the plurality of groups is dependent upon whether the communication network is operating during a busy hour.

5. The method of claim 1 wherein the step of transmitting the information with the first frame offset timing comprises the step of transmitting within a Code Division Multiple Access (CDMA) communication system.

6. A method for transmitting information in a communication network, the method comprising the steps of:

transmitting from a first base station, the information in a first group having a first discrete frame offset timing;

determining a need for a remote unit to communicate with a second base station;

determining, from a plurality of groups having a plurality of discrete frame offset timings, an amount of space available in any of the plurality of groups;

transmitting the information in a second group having a second discrete frame offset timing, wherein the step of transmitting the information in the second group is based on the amount of space available in any of the plurality of groups and;

buffering the information for an amount of time equal to a time between the first discrete frame offset timing and the second discrete frame offset timing.

7. The method of claim 6 wherein the step of transmitting the information in the second group comprises the step of transmitting the information in the second group wherein the second group is one frame offset prior to the first group.

8. A method for transmitting information in a communication network, the method comprising the steps of:

transmitting at a first time, the information utilizing a packet scheme wherein the information transmitted is assigned to a first frame offset chosen from a first plurality of frame offsets, wherein the first time is a time corresponding to non-busy hours of operation; and transmitting at a second time, the information utilizing the packet scheme, wherein the information transmitted is assigned to a second frame offset chosen from a second plurality of frame offsets, wherein the second plurality of frame offsets is different in number than the first plurality of frame offsets.

9. The method of claim 8 wherein the step of transmitting at the second time comprises the step of transmitting at a second time corresponding to busy hours of operation.

10. An apparatus for transmitting information in a communication network, the apparatus comprising:

a processor for determining, from a plurality of groups having a plurality of discrete frame offset timings, an amount of space available in any of the plurality of groups and assigning the information transmitted to a first group existing within the plurality of groups based on the determination, wherein the first group has a first frame offset timing and a number of groups within the plurality of groups is based on whether the communication network is operating during a busy hour; and RF circuitry for transmitting the information with the first frame offset timing.

11. The apparatus of claim 10 wherein the communication network comprises a Code Division Multiple Access (CDMA) communication system.

12. An apparatus for transmitting information in a communication network, the apparatus comprising:

RF circuitry existing in a first base station, for transmitting the information in a first group having a first discrete frame offset timing;

a processor for determining a need for a remote unit to communicate with a second base station, the processor determining, from a plurality of groups having a plurality of discrete frame offset timings, an amount of space available in any of the plurality of groups; and RF circuitry existing in a second base station, for transmitting the information in a second group having a second discrete frame offset timing based on the amount of space available in any of the plurality of groups, wherein the second discrete frame offset timing is one discrete offset from the first discrete frame offset timing.

* * * * *